United States Patent [19]

Kojima et al.

[11] 4,312,559

[45] Jan. 26, 1982

[54] METHOD OF PRODUCING AN INLINE HOLOGRAM LENS

[75] Inventors: Chiaki Kojima; Hiroshi Ohki; Kayoko Hasegawa, all of Kanagawa, Japan

[73] Assignee: Sony Corporation, Tokyo, Japan

[21] Appl. No.: 145,687

[22] Filed: May 1, 1980

[30] Foreign Application Priority Data

May 7, 1979 [JP] Japan .................................. 54-56206
May 25, 1979 [JP] Japan ............................. 54-71043[U]
May 7, 1980 [JP] Japan .................................. 55-56205

[51] Int. Cl.³ ............................................. G02B 5/32
[52] U.S. Cl. .................................... 350/3.72; 350/3.75
[58] Field of Search ..................... 350/320, 3.72, 3.70, 350/3.69, 3.66, 3.75

[56] References Cited

U.S. PATENT DOCUMENTS 3,807,829  4/1974  Close ................................. 350/3.72
4,054,356  10/1977  Noguchi ........................... 350/3.72
4,245,882  1/1981  Chang ............................... 350/3.72

*Primary Examiner*—John K. Corbin
*Assistant Examiner*—Bruce Y. Arnold

*Attorney, Agent, or Firm*—Lewis H. Eslinger; Alvin Sinderbrand

[57] ABSTRACT

An inline hologram lens suitable for use in an optical reproducing head is formed by first preparing a mother off-axis hologram lens by exposing a photo-sensitive layer to a subject wave beam and an off-axis reference wave beam, and then developing the photo-sensitive layer; and subsequently by forming the inline hologram lens by exposing a second photo-sensitive layer to an interference pattern formed by passing an inline reference wave beam through the mother off-axis hologram lens to be incident normal to the second photo-sensitive layer while passing an off-axis subject coherent beam at an angle through said off-axis mother hologram lens to form a subject beam that is focussed a predetermined distance from the second photo-sensitive layer, and finally by developing the second photo-sensitive layer. Preferably, the mother hologram lens has a diffraction efficiency of less than unity. An optical reproducing head utilizing such an inline hologram lens includes a beam-splitter, a quarter-wave plate, the inline hologram lens, and a transparent adhesive to adhere the beam-splitter, plate, and lens to one another.

13 Claims, 14 Drawing Figures

METHOD OF PRODUCING AN INLINE HOLOGRAM LENS

BACKGROUND OF THE INVENTION

1. Field of the Invention

The present invention relates generally to hologram lenses and is directed more particularly to a method of producing an inline hologram lens.

The invention relates also to an inline hologram lens produced by the novel method.

The invention further relates to a novel optical reproducing head using the above inline hologram lens.

2. Description of the Prior Art

Previously, there has not been proposed any satisfactory, simple method which yields an inline hologram lens with a large N.A. (numerical aperture).

Because of the lack of suitable inline hologram lenses, prior art optical reproducing heads have many drawbacks, such as their substantial mass and great production expense as well as other problems.

OBJECTS AND SUMMARY OF THE INVENTION

Accordingly, an object of the present invention is to provide a novel method of producing a hologram lens free of the defect encountered in methods of the prior art.

Another object of the invention is to provide a novel method of producing an inline hologram lens.

A further object of the invention is to provide an inline hologram lens.

A yet further object of the invention is to provide an optical reproducing head.

According to an aspect of the present invention, a method of producing an inline hologram lens comprises the steps of recording on a first photo-sensitive layer the holographic interference pattern which results from simultaneous exposure of said layer to a reference wave beam and to a subject wave beam, said two beams being off-axis with respect to each other, with one of the beams being incident perpendicular to the layer; forming an off-axis mother hologram lens by developing said first photo-sensitive layer; positioning a second photo-sensitive layer parallel to said off-axis hologram lens providing an off-axis reference wave beam incident on said hologram lens to produce a subject wave beam incident on the second photo-sensitive layer; providing, simultaneously a reference beam incident on said off-axis hologram lens and passing therethrough to be incident on said second photo-sensitive layer as a reference wave beam: and developing said second photo-sensitive layer to produce said inline hologram lens.

According to another aspect of the invention, there is provided an inline hologram lens produced by the above method.

According to a further aspect of the invention, an optical reproducing head is provided which a laser or other coherent beam passes through to an optical record medium and through which a reflected beam from said record medium is directed to a photo-detector, said optical reproducing head comprising, (a) a beam splitter;
(b) a quarter wave plate,
(c) an inline hologram lens in the path of the coherent produced by exposing a photo-sensitive layer to a holographic interference pattern which results from passing a reference coherent beam through an off-axis mother hologram lens parallel to the photo-sensitive layer, the reference beam being incident substantially perpendicular onto the mother hologram lens and onto the photo-sensitive layer, while simultaneously passing an off-axis coherent beam at an angle through said off-axis mother hologram to provide a subject beam so that the latter focusses the subject beam a predetermined distance from the photo-sensitive layer, and thereafter by developing the photo-sensitive layer; and a transparent adhesive for adhering the beam splitter, the quarter wave plate, and the inline hologram lens to one another.

Various other objects, features and advantages of the present invention will become apparent from the following description taken in conjunction with the accompanying drawings through which like reference characters identify the same elements and parts.

DESCRIPTION OF THE PREFERRED EMBODIMENTS

Before describing the present invention, and by way of background therefor a hologram lens will be described. A hologram lens can be either a so-called inline hologram lens or a so-called off-axis hologram lens. The conventional method of forming these two hologram lenses will be now briefly described.

Figure 1:
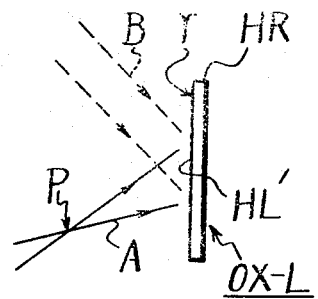
FIGS. 1 to 4 are respectively schematic diagrams used to explain the prior art record and reproduction methods of hologram lenses.

Firstly, the method of forming an off-axis hologram lens will be discussed. As shown in FIG. 1, on the photo-sensitive recording surface r of a hologram record medium HR, a record subject wave beam (spherical wave beam) A and a record reference wave beam (plane or spherical wave beam) B each impinge upon medium HR at an incidence angle of about 45° with respect to the normal to the surface r, (hence the name "off-axis"), so that an off-axis hologram lens portion HL' which can be, for example, disc-shaped, and which consists of an interference image or pattern, is recorded. The development process of the recorded surface r is conventional, and a description of the developing thereof is omitted. In this method, the record subject wave beam A is provided by using an optical lens and so that the subject wave beam A converges or focusses at a point P and diverges after the point P. Further, both the beams A and B are emitted from the same laser light source. Thus, is formed an off-axis hologram lens OX-L.

Figure 2:
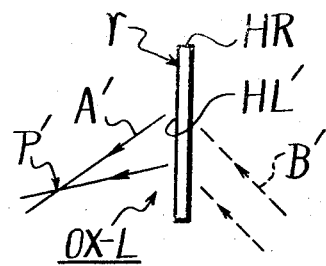

When the off-axis hologram lens OX-L is reproduced, that is, is used to reproduce the focusing effect, as shown in FIG. 2, a reproduction reference wave beam B' similar to the beam B shown in FIG. 1 is incident onto the off-axis hologram lens portion HL' from the side opposite to the record surface r along the extended line of record reference wave beam B shown in FIG. 1. Then, a reproduction subject wave beam A' is reproduced from the side of record surface r, and such beam A' is converged or focussed to a point P'. On the contrary, when the reproduction reference wave beam is incident onto the same record surface r of record medium HR as the record reference wave beam B in FIG. 1, i.e., opposite to that of FIG. 2, a reproduction subject wave beam is reproduced from the surface of record medium HR opposite to the record surface r and such reproduction wave beam diverges along the extended line of record subject wave beam A in FIG. 1.

Figure 3:
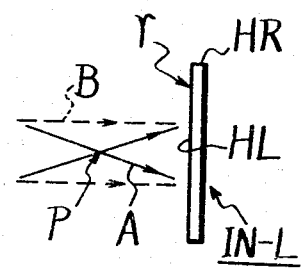

Now, the inline hologram lens will be described. As shown in FIG. 3, the record subject wave beam (spherical wave beam) A and the record reference wave beam B (plane or spherical beam) B are both incident onto the record surface r of hologram record medium HR, and those beams A and B have coincident optical axes which are normal to the surface r i.e., inline with each other, to form an inline hologram lens portion HL consisting of an interference image or pattern. The remainder of the inline hologram lens is substantially same as the corresponding portions of the off-axis hologram shown in FIG. 1. Thus is formed an inline hologram lens IL-L.

Figure 4:
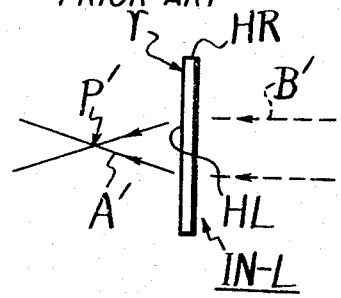

When the inline hologram lens IL-L is reproduced, if, as shown in FIG. 4, a reproduction reference wave beam B' similar to the record reference wave beam B shown in FIG. 3 falls onto the inline hologram lens portion HL from the side opposite the record surface r of record medium HR along the extended line of beam B, a reproduced subject wave beam A' is reproduced from the record surface r which converges or focusses at a point A'. In an inline hologram, it is also possible that the reproduction reference wave beam can be incident onto the record surface r of hologram record medium HR to reproduce the diverging subject wave beam. The remainder of the reproducing operation of FIG. 4 is substantially the same as that of FIG. 2.

The hologram lens thus formed is lightweight and comparatively small. In addition, by selecting an appropriate mother lens, which is to provide a subject wave beam, a lens with a desired N.A. (numerical aperture) and a desired operating distance can be made, and such a lens can be mass-produced by duplicating the same.

An objective lens, which is used as, for example, an optical signal reproduction head in an optical signal reproduction apparatus, requires a rather large numerical aperture (N.A.), and, conventionally an optical lens formed of a number of lens sets and resembling the objective lens of a microscope, in used widely. However, such an objective lens can not be made small and light weight, and the focussing servo for moving the objective lens up and down is required to be rather large since it requires a large amount of mechanical energy to move the conventional objective lens.

Therefore, it is desirable to use the above hologram lens as the objective lens of an optical signal reproduction head. However, an off-axis hologram lens is not especially suitable as the objective lens of the optical signal reproduction head for the following reasons.

Firstly, since the objective lens is moved up and down by the focussing servo as described above, it is necessary that the reproduction reference wave beam is simultaneously moved up and down in parallel to fall accurately and positively on the lens portion of the off-axis hologram lens. By way of contrast, in the case of an inline hologram lens, since the direction of motion of the lens is coincident with the propagation direction of the reproduction reference wave beam, it is unnecessary to move the reproduction reference wave beam simultaneously.

Secondly, it is necessary that the off-axis hologram lens be rotated and adjusted for the reproduction reference wave beam about three mutually perpendicular axes to bring the focussing or converging point of the reproduction subject wave beam to a predetermined position. This adjustment is very complicated and almost impossible when the N.A. of the lens is large. Again by way of contrast, the inline hologram lens does not require such a difficult adjustment.

From the above discussion, it will be understood that the inline hologram lens is well suited as an objective lens of an optical signal reproducing head.

Figure 5:
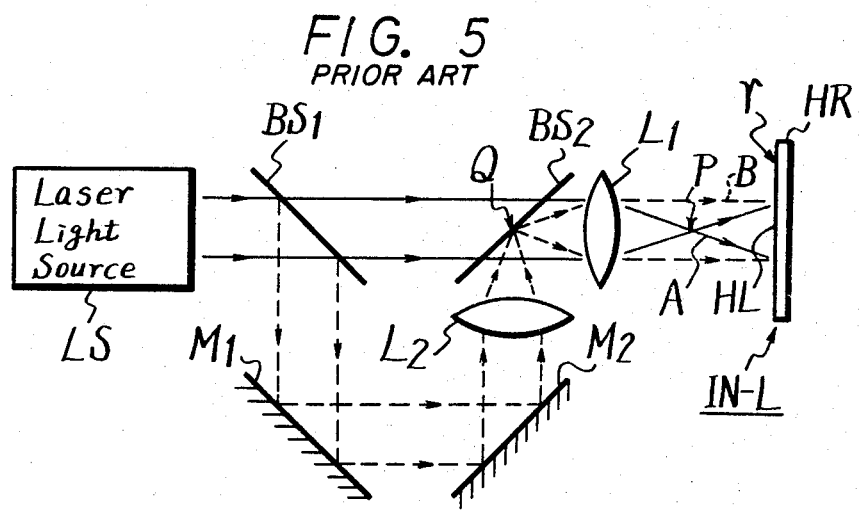
FIG. 5 is a schematic diagram used to explain the prior art record method of a prior art inline hologram lens.

Although the manner of forming or recording the a prior art, inline hologram lens is described briefly with reference to FIG. 3, it will be described in detail with reference to FIG. 5. The record subject wave beam A and the record reference wave beam B, which are coincident in optical axis on the normal to the record surface r of hologram record medium HR are incident onto a circular area of record surface (photo-sensitive surface) r of hologram record medium HR to form interference patterns thereon so that the exposed portion becomes the inline hologram lens portion HL. Here both beams A and B are provided by the laser beam from a laser beam or light source LS.

The record subject wave beam A is formed in the following manner. A part of the laser beam (here a plane wave beam) from the laser light source LS passes through two beam splitters BS1 and BS2 and thence through a mother lens (here an optical convex lens) L1 to be focussed at a point P (which corresponds to the rear focal point of lens L1) and to be diverged therefrom to thereby produce a spherical wave beam (which is the record subject wave beam A). At the same time, the record reference wave beam B is formed in the following manner. A part of the laser beam from the laser light source LS is reflected by the beam splitter BS1, further reflected by two mirrors M1 and M2 and then is incident on an auxiliary lens (here an optical convex lens) L2. The beam emitted from the lens L2 is focussed at a center point Q on the beam splitter BS2 (which corresponds to the rear focal point of lens L2), then is reflected on the beam splitter BS2 and passed through the mother lens L1 to be the record reference wave beam B (which is a parallel plane wave beam).

In this case, the N.A. of inline hologram lens IN-L thus made depends upon the N.A. of mother lens L1. When this inline hologram lens IN-L is used as the objective lens of an optical signal reproducing head, it is necessary to select the N.A. of inline hologram lens IN-L rather large. Therefore, in such a case, lenses with high N.A. must be of course used as the lenses L1 and L2.

When ordinary optical lenses are used as the lenses L1 and L2, a lens consisting a number of lens sets must be used as in the objective lens of a microscope. Unfortunately, as the N.A. becomes large, the focal lengths of lenses L1 and L2 become so short that the lenses L1 and L2 would have to be in the same location, with the result that the method of forming the inline hologram lens shown in FIG. 5 cannot be used for lenses of high N.A.

In order to avoid this problem, the following method of recording an inline hologram lens with a large N.A. has been proposed. A beam splitter is provided in opposing relation to a hologram record medium, an optical lens consisting of a number of lens sets is located on the side opposite of the beam splitter from an objective lens, the laser beam from a laser light source is incident on the objective lens, the diverging beam passing therethrough falls onto the hologram record medium through the beam splitter as a record subject wave beam, the laser beam is also incident onto an auxiliary lens to be a record reference wave beam, this record reference wave beam is reflected on the above beam splitter, and then the reflected record reference beam falls onto the hologram record medium.

With the above record method, since the record subject wave beam (there, a spherical beam) from the objective lens passes through the beam splitter, it is subjected to aberration. To avoid this defect, it is necessary either to use a special objective lens to thereby correct the aberration of the record subject wave beam, or else to use a similar beam splitter upon reproduction. This is, however, quite impractical for most purposes and, therefore, is not preferred.

Now, the method for manufacturing an inline hologram lens with a large N.A. according to the present invention, will be described wherein the hologram lens, is free of the prior-art defects and can be easily manufactured.

An embodiment of the invention will be described with reference to FIG. 6. In this embodiment, an off-axis hologram lens OX-L, which is made by using a record subject wave beam and a record reference beam in an off-axis relationship with each other and which has a diffraction efficiency less than 100%, is used as a mother lens (objective lens). The method of making the off-axis hologram lens OX-L, especially its record method will be described later with reference to FIG. 8. The off-axis hologram lens OX-L is formed of a hologram record medium HR2, which consists of a glass substrate GS and a photo-sensitive layer (record layer) K coated on the glass substrate GS. On the center portion of photo-sensitive layer K, there is recorded a disc-shaped off-axis hologram lens portion HL' which is then developed as described below. In this case, the off-axis hologram lens OX-L is so formed that when a reproduction reference wave beam (either a plane or a spherical wave beam—in this example, the plane wave beam is used) B' impinges onto the lens portion HL' in the photo-sensitive layer K through the glass substrate GS at an angle of about 45° with respect to normal on the lens portion HL', a reproduction subject wave beam A' is reproduced from the photo-sensitive layer K which has its optic axis along the normal and is focussed at a point P.

Figure 6:
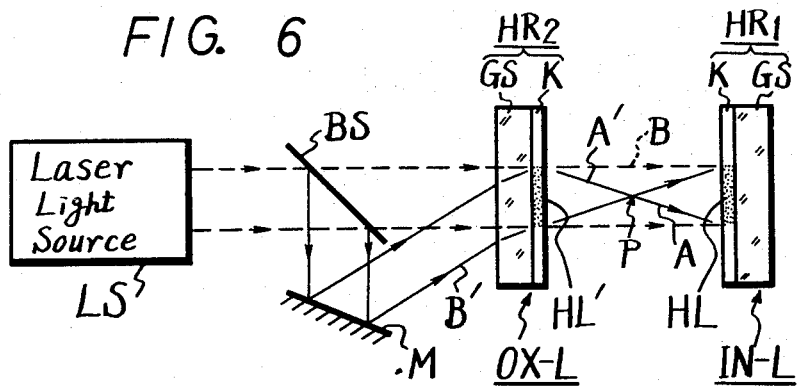
FIG. 6 is a schematic diagram showing an example of the method of producing an inline hologram lens according to the present invention.

In FIG. 6, HR1 designates a hologram record medium on which an inline hologram lens IN-L is to be formed and which is formed of a glass substrate GS and a photo-sensitive layer K.

The off-axis hologram lens OX-L, serving as the mother lens, is disposed so as to face the hologram record medium HR1. In this case, the off-axis hologram lens OX-L is so located for the hologram record medium HR1 that the photo-sensitive layer K of the former is parallel to the photo-sensitive layer K of the latter and is separated by a predetermined distance.

The laser beam (here a parallel plane wave beam) from a laser light source LS is partially reflected on a beam splitter BS, further reflected on a mirror M, and the reflected beam (parallel plane wave beam) therefrom impinges onto a photo-sensitive layer K through a glass substrate GS of off-axis hologram lens OX-L as the reproduction reference wave beam B'. Then, from the off-axis hologram lens OX-L, the reproduction subject wave beam A' is reproduced and is focussed at a point P from which it then diverges. This beam A' is incident on the photo-sensitive layer K of hologram record medium HR1 as a record subject wave beam A.

The laser beam from the laser light source LS partially passes through the beam splitter BS, then passes through the off-axis hologram lens OX-L and is incident on the photo-sensitive layer K of hologram record medium HR1 as a record reference wave beam B. The latter beam is in inline relation to the record subject wave beam A (that is to say, the beams A and B are coincident in optical axis). Thus, a disc-shaped inline hologram lens portion HL is formed on the center portion of photo-sensitive layer K of record medium HR1. This record medium HR1 is then subjected to a developing process, which will be described below, after which it becomes an inline hologram lens IN-L.

Figure 7:
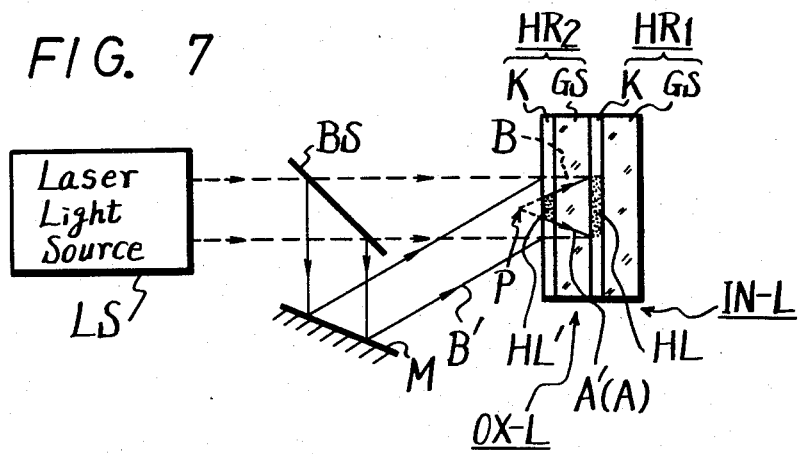
FIG. 7 is a schematic diagram showing another example of the method of producing an inline hologram lens according to the invention.

Another example of the invention will be described with reference to FIG. 7. In this example, the off-axis hologram lens OX-L, serving as the mother lens, is so located for the hologram record medium HR1 that the glass substrate GS of the former is in contact with the photo-sensitive layer K of the latter. The remaining elements shown in FIG. 7 are disposed similarly to these shown in FIG. 6. Then, the recording as the inline hologram lens IN-L is carried out. In this case, the reproduction and record subject beams A' and A are each a diverging spherical wave beam which diverges from a virtual focal point P.

Now, with reference to FIG. 8 the method of manufacturing the off-axis hologram lens OX-L used as the mother lens will be described.

A record subject wave (spherical wave) beam A impinges onto the photo-sensitive layer K of hologram record medium HR2, which further includes the glass substrate. The record subject wave beam A is directed such that the optic axis of the beam A is coincident with the normal to the photo-sensitive layer K. A record reference wave (parallel plane wave) beam B also impinges onto the photo-sensitive layer K in such a manner that its optical axis intersects the normal at about 45°. Thus, a disc-shaped off-axis hologram lens portions HL' is recorded on the center portion of the photo-sensitive layer K. Thereafter, the photo-sensitive layer K is developed to provide the off-axis hologram lens OX-L. In this case, the record subject wave beam A is produced by the following manner. That is, the laser beam (parallel plane wave) from a laser light source LS is partially transmitted through a beam splitter BS, then is incident on an auxiliary lens (optical lens) L2, and then is focussed at a point Q (here the focal point of lens L2). The spherical wave beam diverging from the point Q is incident on a mother lens L1 (i.e., an objective lens which is made of a number of lens sets) to focus the beam at a point P. The spherical wave beam diverging from the point P is used as the record subject wave beam A.

The record reference wave beam B is provided by the following manner. The laser beam from the laser light source LS is partially reflected on the beam splitter BS, and then further reflected on a mirror M. The beam reflected on the mirror M is used as the record reference wave beam B.

An objective lens of a microscope with a N.A. of, for example, 0.4 or 0.5 is employed as the mother lens L1. The aperture of the off-axis hologram lens portion HL' is selected to be 2 mm in diameter and the operation distance thereof is, for example, 2.3 mm. Accordingly, the inline hologram lens portion HL of inline hologram lens IN-L shown in FIG. 6 has an aperture of 2 mm and an operating distance of 2.3 mm.

Figure 8:
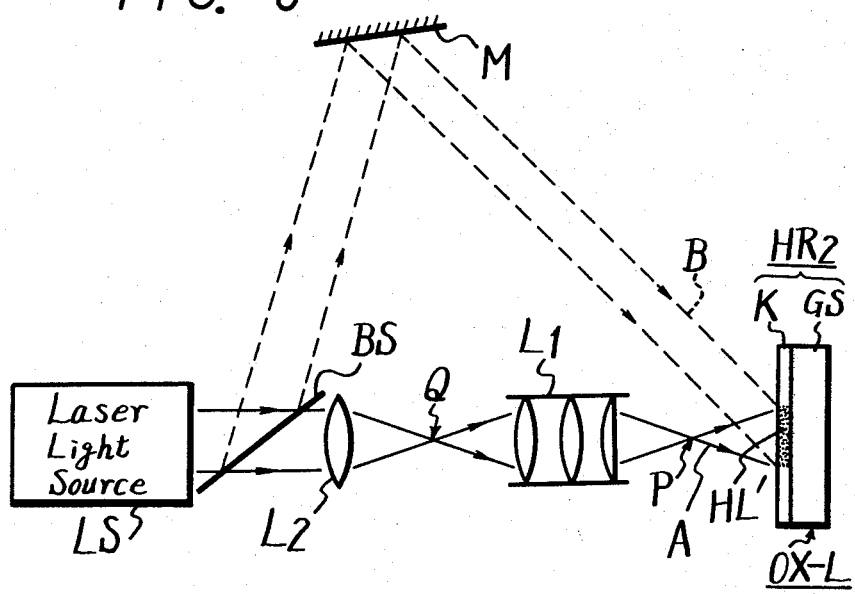
FIG. 8 is a schematic diagram used to explain an example of the method of producing off-axis mother hologram lens used in the examples shown in FIGS. 6 and 7.

The laser light source LS used in the examples of FIGS. 6, 7, and 8 should produce the following wavelength laser beams:

Argon laser beam ($\lambda=4880$ Å)
Krypton laser beam ($\lambda=6471$ Å)
Coloring laser beam ($\lambda=6330$ Å)
He-Ne laser beam ($\lambda=6328$ Å)

The appropriate type of photo-sensitive layers K of hologram record media HR1 and HR2 shown in FIGS. 6, 7, and 8 is selected in accordance with the laser beam.

Next, an example of the method of making the hologram record media HR1, HR2 and hologram lenses IN-L, OX-L will be described. For the hologram record media a suitable amount of layer hardening agent such as an aqueous solution of gelatin added with formaldehyde glyoxal is maintained at about 40° C. (104° F.), while a glass substrate with a thickness of 1 mm and a spinner are also maintained at about 40° C. Then, the aqueous solution of gelatin is coated on the glass substrate by means of the spinner. In this case, the coating thickness of gelatin aqueous solution on the glass substrate is selected such that the thickness of the resulting dried coating is 5 mm in the hologram record medium for the off-axis hologram lens and 15 mm for the inline hologram lens. The gelatin water solution coated on the glass substrate is dried to form a gelatin layer which is a mother material of the photo-sensitive layer.

Next, photo-sensitivity is imparted to the gelatin layer as described hereinbelow.

Photo-sensitivity to the blue or green beam is imparted to the gelatin layer in the following manner. The gelatin layer is immersed in 2 to 10 weight percent of aqueous solution of ammonium bichromate for about 10 minutes, then is removed gradually therefrom, held vertically and then dried in a darkroom.

Photo-sensitivity to the red beam is imparted to the gelatin layer in a similar manner. An aqueous solution of 2 weight percent of ammonium bichromate and $1\times10^{-3}$ mol/l of methylene blue coloring agent is added with ammonium to adjust the pH to about 10, then the gelatin layer is immersed in this aqueous solution in about 10 minutes and finally is dried in a flowing atmosphere including ammonia and dried nitrogen.

The above manufacturing process results in the hologram record medium consisting of the glass substrate and the photo-sensitive layer K therein.

Exposure of the photo-sensitive layer K of the hologram record medium is carried out as described hereinbelow with referece to FIGS. 6, 7, and 8. In this case, the radiant energy of the laser beam is selected to be in the range of 100 to 1000 mJ/cm².

The hologram record medium, whose photo-sensitive layer has been exposed, is first immersed in water. When the photo-sensitive layer is sensitive to the blue or green beam, it is immersed in the flowing water at about 20° C. (68° F.) for about one hour, and when the photo-sensitive layer in sensitive to the red beam, it is immersed in water at about 40° C. (104° F.) for about 30 minutes. Thereafter, the hologram record medium is immersed in an aqueous solution of 50% isopropanol for about 10 minutes, then is dipped into aqueous solution of 90% isopropanol for several seconds, then is immersed in 100% isopropanol for about 10 minutes, and finally rapidly dried by circulating hot air. Thus, the developing treatment is finished.

Figure 9:
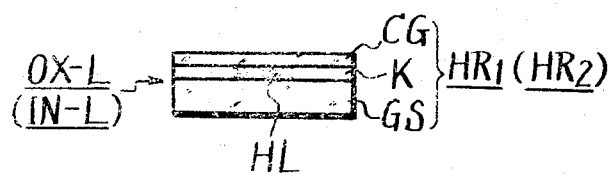
FIG. 9 is a cross-sectional view showing the hologram lens produced by the record method shown in FIGS. 6, 7 and 8.

The photo-sensitive layer, whose mother material is a gelatin layer, has a moisture absorption property, so that if it is left without further treatment, it is possible that the photographic image forming the hologram lens could disappear. To avoid this possibility, as shown in FIG. 9, a cover glass CG with the thickness of about 150 μm is bonded to the photo-sensitive layer K by means of a resin which is hardened by ultraviolet rays. Thus, the hologram lenses OX-L and IN-L are made. In the drawings other than FIG. 9, the cover glass CG is omitted for simplicity of the drawing.

Now, the manner to manufacture a "slave" reproduced inline hologram lens IN-L' by using the inline hologram lens IN-L thus produced as the mother lens, will be described.

Figure 10:
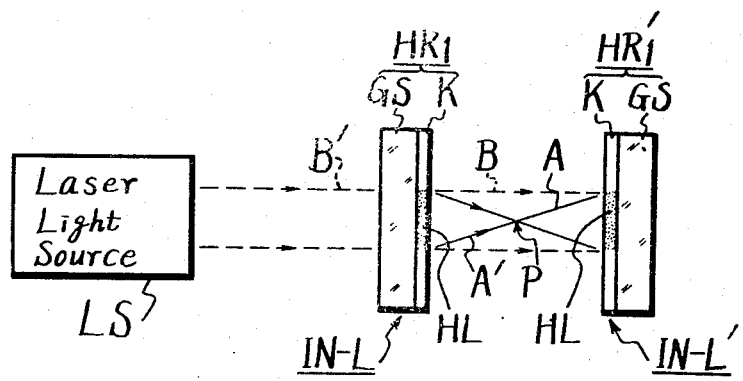
FIGS. 10 and 11 are respectively schematic diagrams showing examples of the reproduction methods for making a slave inline hologram lens.

As shown in FIG. 10, hologram record media HR1 and HR1' are so disposed that the photo-sensitive layer K of the latter, which is to be a slave inline hologram lens IN-L', is positioned to face, at a predetermined distance, the photo-sensitive layer K of the former, which has diffraction efficiency of 50%. Then, the laser beam from laser light source LS is incident onto the glass substrate GS of hologram record medium HR1. In this case, a part of the beam (50%) is used as a reproduction reference wave beam B' and the remaining part of the beam (50%) is used as a record reference wave beam B for the hologram record medium HR1'. Thus, from the mother inline hologram lens IN-L, there is reproduced a reproduction subject wave beam A' which is focussed at a point P and which is in turn incident onto the hologram record medium HR1' as a record subject wave beam A to form a hologram lens portion HL on the photo-sensitive layer K thereof.

Figure 11:
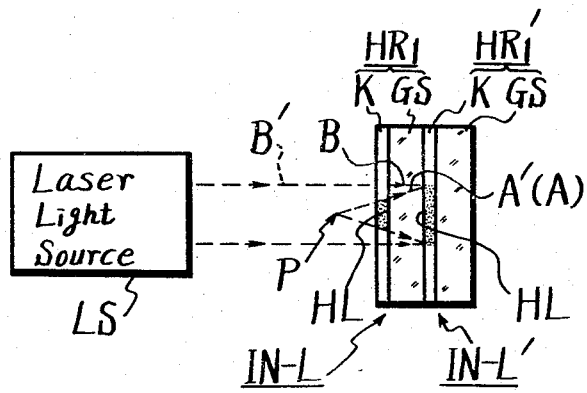

A slave inline hologram lens IN-L' can alternatively be made in the manner shown in FIG. 11. In this case, the photo-sensitive layer K of hologram record medium HR1' is in direct contact with the glass substrate GS of mother inline hologram lens IN-L with both hologram record mediums HR1 and HR1' being located in the same order shown in FIG. 10. In this case, reproduction and record subject wave beams A' and A are both spherical wave beams that diverge from a virtual focal point P.

As described above, the simple and straightforward method of the present invention, permits as inline hologram lens with a large N.A. to be easily manufactured.

A hologram lens constructed according to the method of this invention can be favorably employed in an optical signal reproduction head as an inclined hologram lens.

Figure 12:
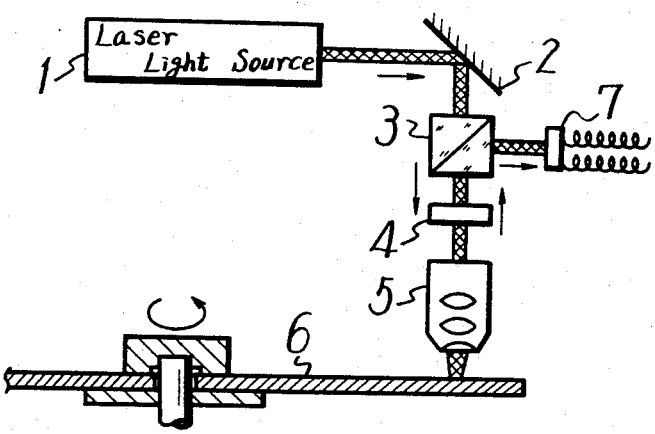
FIG. 12 is a schematic diagram showing a prior art optical signal reproduction head system.

A prior art optical signal reproduction head will be now described with reference to FIG. 12, in which a laser light source, such as a He-Ne laser emits, for example, a P-polarized light (linearly or plane polarized light) laser beam. This laser beam from the laser light source 1 is reflected by a mirror 2 and its direction of propagation is changed by 90° to be incident through a beam splitter 3 on a quarter-wave or $\lambda/4$ plate 4. In this $\lambda/4$ plate 4, the P-polarized laser beam is converted from linearly polarized light into circularly polarized light which is focussed through an objective lens 5 onto the record surface of a disc-shaped optical record medium 6 on which information signals such as an audio signal, a video signal or the like which are pulse-code-modulated, are recorded as a spiral track consisting of rows of spaced-apart pits.

The light reflected back from the record medium 6 is again incident on the $\lambda/4$ plate 4 through the objective lens 5. In the $\lambda/4$ plate 4, the circularly polarized light is converted in to an S-polarized light (linearly polarized light) laser beam and is incident on the beam splitter 3 which reflects the incident laser beam in the lateral direction in FIG. 12 so that the reflected laser beam is incident on a photo-diode 7 serving as a light receiving element. This light receiving element 7 then produces a reproduced output signal.

In the above prior art optical signal reproduction head, an optical lens, which consists of a number of set lenses similar to those used in a microscope, is employed as the objective lens 5, and this objective lens 5 is moved up and down along its optical axis by electro-magnetic means by a linear motor (not shown in FIG. 12) to carry out a focus servo function. Further, as the mirror 2, a galvano-mirror is used, and such mirror 2 is rotated in response to detected tracking displacement to achieve generally a tracking servo function.

As described above, in the prior art, the optical lens consisting of a number of set lenses is used as the objective lens 5, and such objective lens 5 is rather heavy. Thus, in order to move the optical lens 5 up and down along it optical axis direction the focus servo must exert a rather large amount of mechanical energy. Moreover the lens 5 is very expensive. Further, it is also possible that the relative positional relation among the optical elements will change over a long period of time since elements of the optical system are spaced apart from one another. As is apparent, it can not be avoided in the prior art that the entire optical system is far from compact, but rather occupies a large amount of space.

If an inline hologram lens made by the method of the present invention is used in place of the objective lens 5 of the optical signal reproduction head, the above defects of the prior art can be avoided.

An example of an optical signal reproduction head utilizing a hologram lens (inline hologram lens) made according to the present invention is now described with reference to FIG. 13.

Figure 13:
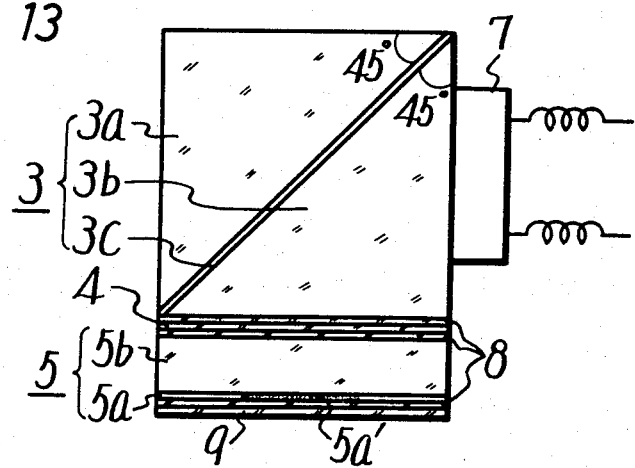
FIG. 13 is a cross-sectional view showing an example of the inline hologram lens made according to this invention and used in an optical signal reproduction head system.

In the example of FIG. 13, a hologram lens is used as the objective lens 5 similarly to the above prior art optical signal reproduction head, and the beam splitter 3, $\lambda/4$ plate 4 and hologram lens 5 are bonded together by a light-pass-permissible (transparent) adhesive agent.

In the example of FIG. 13, the beam splitter (polarized light beam splitter) 3 can be made in the following manner. On each of the inclined surfaces of 45°-prisms 3a and 3b, there is formed a multi-layer film 3c which serves to bond both the prisms 3a and 3b together as the beam splitter 3 in the form of a cubic body with one section of about 5 mm and 300 mg in weight. The $\lambda/4$ plate 4 is made of an extension film of polymer (for example, polypropylene), selected to be 15 $\mu$m in thickness, a thickness which is selected in response to the wavelength 6328 Å of a He-Ne laser beam, and is of negligibly weight as compared with beam splitter 3.

The hologram (objective) lens 5 is formed as an inline hologram lens made according to the method of the invention and for example can be structured as follows. A photo-sensitive layer 5a with a thickness of 1 mm is formed on the surface of a square glass plate or substrate 5b with a thickness of 5 mm and a disc-shaped lens portion 5a' is formed on the center portion of photo-sensitive layer 5a. In this case, the lens portion 5a' is selected about 0.4 in N.A., having an operational distance, or focal length of about 2.3 mm and an aperture of about 2 mm.

The $\lambda/4$ plate 4 is bonded to the lower surface of prism 3b of beam splitter 3 by a light-pass-permissible adhesive layer 8, the glass plate 5b of inline hologram lens 5 is bonded to the lower surface of $\lambda/4$ plate 4 by another light-pass-permissible adhesive layer 8, and a cover glass plate 9 is bonded to the lower surface of photo-sensitive layer 5a of hologram lens 5 by a further light-pass-permissible adhesive layer 8.

As the light-pass-permissible adhesive layer 8, an ultraviolet-light-hardenable adhesive (for refractive index is substantially same as that of glass, is used.

The cover glass plate 9 is a glass square plate with a width of 5 mm and a thickness of 0.15 mm. The total weight of hologram lens 5 and cover glass plate 9 is about 70 mg, and the total weight of beam splitter 3, $\lambda/4$ plate 4, hologram lens 5 and cover glass plate 9, which are bonded together as shown in FIG. 13, preferably weighs less than about 400 mg.

Further, a photo-diode can be used as the light receiving element 7, and can be attached to the side surface of prism 3b of beam splitter 3. In this case, a light-pass-permissible adhesive can be also used to bond the light receiving element 7 to the prism 3b of beam splitter 3.

In the optical signal reproduction head described in connection with FIG. 13, since the hologram lens has a glass substrate and also has a cover glass, because its photo-sensitive layer is made mainly of gelatin and it is necessary to prevent dissolving of the hologram lens due to the moisture absorbing property of gelatin, the head becomes complex and requires a multiplicity of working processes to assemble.

Another example of the optical signal reproduction head, which is light in weight, simple in construction and easy to manufacture, will be now described with reference to FIG. 14. In this example, a hologram lens is used as the objective lens 5 in the optical signal reproduction head shown in FIG. 12 and the $\lambda/4$ plate 4 is used as the substrate or protective plate of the hologram lens.

Figure 14:
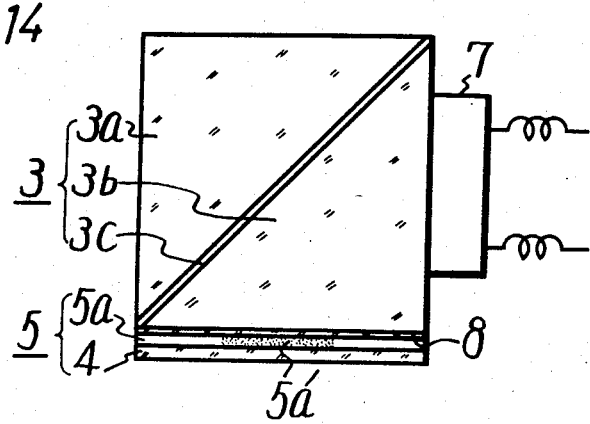
FIG. 14 is a cross-sectional view showing another example of the hologram lens made by the invention and used in the optical signal reproduction head.

The parts or elements shown in FIG. 14 corresponding to those of FIG. 13 are identified with the same reference characters and their description will be omitted.

In the example of FIG. 14, as the objective lens 5, a hologram lens is used and as the transparent substrate of hologram lens 5, the λ/4 plate 4 is employed. The photo-sensitive layer 5a, on which the hologram lens portion 5a' of hologram lens 5 is formed, is bonded to the lower surface of prism 3b of beam splitter 3 by means of a light-pass-permissible agent layer 8 to be an integral body. Further, as with to the embodiment of FIG. 13, the light receiving element 7 is bonded to the side surface of prism 3b of beam splitter 3 by means of a light-pass-permissible agent.

When the hologram lens 5 is considered as a single unit, it is seen that the λ/4 plate serves in place of the cover glass 9 of FIG. 13.

It will be apparent that many modifications and variations can be effected by one skilled in the art without departing from the scope and spirit of the present invention, which are to be determined by the appended claims.

We claim as our invention:

1. A method of producing an inline hologram lens, comprising the steps of:
   recording on a first photo-sensitive layer a holographic interference pattern which results from simultaneous exposure of said first photo-sensitive layer to a reference wave beam and to a subject wave beam, said beams being off-axis in respect to each other with said subject wave beam being incident perpendicular to said first photo-sensitive layer;
   developing said first photo-sensitive layer to form an off-axis hologram lens;
   positioning a second photo-sensitive layer on axis and parallel to said off-axis hologram lens;
   providing an off-axis beam having a wave frot essentially identical to said reference wavebeam to be incident on said off-axis hologram lens to produce a subject wave beam incident on said second photo-sensitive layer;
   providing, simultaneously, a reference beam incident on said off-axis hologram lens and passing essentially undeviated, therethrough to be incident on said second photo-sensitive layer as a reference wave beam; and
   developing said second photo-sensitive layer to produce said inline holograms lens.

2. A method of producing an inline hologram lens according to claim 1, wherein said reference wave beams and said subject wave beams are provided as coherent beams.

3. A method of producing an inline hologram lens according to claim 2, wherein said step of recording on said first photo-sensitive layer includes passing a coherent beam through an objective lens with a large numerical aperture to form said subject wave beam.

4. A method of producing an inline hologram lens according to claim 1, wherein said off-axis hologram has a diffraction efficiency of less than unity.

5. A method of producing an inline hologram lens according to claim 1, wherein said off-axis hologram lens is illuminated by said off-axis beam on the side opposite to the side of incidence of said reference wave beam to provide a converging focussed beam that converges to a focus point when said reference wave beam is incident thereon, and said second photo-sensitive layer is disposed a predetermined distance after said focus point.

6. A method of producing an inline hologram lens according to claim 1, wherein said off-axis hologram lens is illuminated by said off-axis beam on the same side as the side of incidence of said reference wave beam to provide a diverging beam that diverges from a focus point when said reference wave beam is incident thereon, and said second photo-sensitive layer is disposed a predetermined distance after said focus point.

7. A method of producing an inline hologram lens according claim 1, wherein said inline hologram lens is provided with a diffraction efficiency of substantially 50%, and said method further includes the steps of:
   placing a third photo-sensitive layer parallel to said inline hologram lens;
   passing a coherent beam through said inline hologram lens to be incident perpendicularly onto said third photosensitive layer so that a part of said coherent beam acts as a subject beam focussed a predetermined distance from said third photo-sensitive layer and the remainder of said coherent beam acts as a reference beam; and
   developing said third photo-sensitive layer to form a slave inline hologram lens.

8. An inline hologram lens produced according to the method claim 1.

9. An optical reproducing head through which a coherent beam of radiation is directed to an optical record medium, and through which a reflected beam of radiation from said optical record medium is directed to photodetecting means for reading the reflected beam, said optical reproducing head comprising:
   beam splitting means in the path of said coherent beam for splitting from said coherent beam a reading beam that is plane polarized in a predetermined direction;
   means for circularly polarizing the plane polarized reading beam; recording on a first photo-sensitive layer a holographic interference pattern which results from simultaneous exposure of said first photo-sensitive layer to a reference wave beam and to a subject wave beam, said beams being off-axis in respect to each other with said subject wave beam being incident perpendicular to said first photo-sensitive layer, developing said first photo-sensitive layer to form an off-axis hologram lens, positioning a second photo-sensitive layer on-axis and parallel to said off-axis hologram lens, providing an off-axis beam having a wave front essentially identical to said reference wave beam to be incident on said off-axis hologram lens to produce a subject wave beam incident on said second photosensitive layer, providing, simultaneously, a reference beam incident on said off-axis hologram lens and passing, essentially undeviated, therethrough to be incident on said second photo-sensitive layer as a reference wave beam, and developing said second photo-sensitive layer to produce said in line holograms lens; and
   transparent adhesive means for adhering said beam splitting means, said means for circularly polarizing, and said inline hologram lens to one another.

10. An optical reproducing head according to claim 9, wherein said means for circularly polarizing includes a quarter-wave plate.

11. An optical reproducing head according to claim 10, wherein said inline hologram lens further includes a base plate on which said photo-sensitive layer is disposed, and said quarter-wave plate serves as a protective cover to protect the developed photo-sensitive layer.

12. An optical reproducing head according to claim 10, wherein said quarter-wave plate serves as a base plate on which the photo-sensitive layer of said inline hologram lens is disposed, and further including a protective cover to protect the developed photo-sensitive layer.

13. An optical reproducing head according to claim 9, wherein said inline hologram lens further includes a base plate on which said photo-sensitive layer is disposed and a protective cover to protect the developed photo-sensitive layer.

* * * * *